United States Patent
Tanno

(10) Patent No.: US 11,673,979 B2
(45) Date of Patent: Jun. 13, 2023

(54) BINDER FOR GLASS PAPER

(71) Applicant: Denka Company Limited, Tokyo (JP)

(72) Inventor: Nobuyuki Tanno, Tokyo (JP)

(73) Assignee: DENKI KAGAKU KOGYO KABUSHIKI KAISHA, Tokyo (JP)

(*) Notice: Subject to any disclaimer, the term of this patent is extended or adjusted under 35 U.S.C. 154(b) by 474 days.

(21) Appl. No.: 14/824,434

(22) Filed: Aug. 12, 2015

(65) Prior Publication Data

US 2017/0044407 A1  Feb. 16, 2017

(51) Int. Cl.
- *C09J 129/04* (2006.01)
- *C08F 16/06* (2006.01)
- *D21H 21/18* (2006.01)
- *D21H 19/60* (2006.01)
- *D21H 13/40* (2006.01)
- *D21H 17/36* (2006.01)
- *C08F 8/12* (2006.01)

(52) U.S. Cl.
CPC ............... *C08F 16/06* (2013.01); *C08F 8/12* (2013.01); *D21H 13/40* (2013.01); *D21H 17/36* (2013.01); *D21H 19/60* (2013.01); *D21H 21/18* (2013.01)

(58) Field of Classification Search
None
See application file for complete search history.

(56) References Cited

U.S. PATENT DOCUMENTS

| | | | |
|---|---|---|---|
| 3,544,538 A | | 12/1970 | Masuda et al. |
| 3,937,865 A | * | 2/1976 | Jongetjes ............... B29C 70/00 156/262 |
| 4,710,520 A | * | 12/1987 | Klein ................ B01D 39/2017 521/54 |
| 4,713,285 A | * | 12/1987 | Klein ................ B01D 39/2017 442/335 |
| 5,336,551 A | * | 8/1994 | Graiver ..................... C08J 5/04 428/137 |
| 5,646,192 A | * | 7/1997 | Dolan ........................ B29B 9/02 521/56 |
| 5,800,676 A | | 9/1998 | Koike et al. |
| 2003/0044586 A1 | | 3/2003 | Nojima et al. |
| 2003/0189628 A1 | | 10/2003 | Kaga et al. |
| 2016/0340456 A1 | * | 11/2016 | Mori .................... C11D 3/3753 |

FOREIGN PATENT DOCUMENTS

| | | | | |
|---|---|---|---|---|
| EP | 0374993 A2 | 6/1990 | | |
| EP | 0602810 A1 | 6/1994 | | |
| EP | 0 896 981 A1 | * 2/1999 | .......... B60C 1/0016 |
| EP | 0896089 A1 | 2/1999 | | |
| JP | S63-214356 A | * 9/1988 | ............. B01D 15/04 |
| JP | S63-256799 A | 10/1988 | | |
| WO | 2014/069593 A1 | 5/2014 | | |
| WO | 2016/068337 A1 | 5/2016 | | |

OTHER PUBLICATIONS

Derwent abstract for JP S63-214356A (Year: 1988).*
European Patent Office, Extended European Search Report in European Application No. 16183422.1 (dated Jan. 25, 2017) 9 pages.

* cited by examiner

*Primary Examiner* — Scott R. Walshon
*Assistant Examiner* — Thomas A Mangohig
(74) *Attorney, Agent, or Firm* — Leydig, Voit & Mayer, Ltd.

(57) ABSTRACT

A binder for glass fiber nonwoven comprising a polyvinyl alcohol, the polyvinyl alcohol having a shape with an aspect ratio of 1.9 to 30 and a degree of saponification of 99.0 mol % or more.

4 Claims, No Drawings

BINDER FOR GLASS PAPER

BACKGROUND OF THE INVENTION

Field of the Invention

The present invention relates to a binder for glass fiber nonwoven.

Description of the Related Art

In recent years, synthetic fiber paper and inorganic fiber paper that contain polyvinyl alcohol as a binder are increasingly used. However, adhesion force between the fibers and the binder composed of polyvinyl alcohol is not necessarily excellent. In addition, sometimes when wet with water, the binder function is impaired because polyvinyl alcohol is water-soluble, and thus adequate strength of glass fiber nonwoven is not obtained.

JP S63-256799 A discloses paper composed of 10 to 97% of a chemical fiber and/or an inorganic fiber, 3 to 50% of a polyvinyl alcohol binder in a fiber form or in a powder form, and, where appropriate, not higher than 87% of wood pulp and obtained by heat treatment for not longer than 10 seconds using more than one pair of heated rolls that are at 18 to 270° C. and in contact with each other.

SUMMARY OF THE INVENTION

When formed into a thin film, however, even the paper disclosed by JP S63-256799 A or the like is less prone to have adequate strength.

An object of the present invention is to provide a binder for glass fiber nonwoven and containing a polyvinyl alcohol, the binder being capable of producing glass fiber nonwoven that has adequate strength even when the glass fiber nonwoven is thin.

The present invention provides a binder for glass fiber nonwoven containing a polyvinyl alcohol, in which the polyvinyl alcohol has a shape with an aspect ratio of 1.9 to 30 and a degree of saponification of 99.0 mol % or more.

Because the binder for glass fiber nonwoven of the present invention contains the polyvinyl alcohol that has the degree of saponification and aspect ratio within the ranges described above, the binder is considered to allow glass fibers dispersed therein more uniformly, leading to strong bonding formed among the glass fibers and uniform bonding strength achieved in a direction parallel to a surface of the glass fiber nonwoven. Accordingly, even when it is thin, the glass fiber nonwoven has adequate strength.

The degree of swelling of the polyvinyl alcohol may be 2.5 to 5.0. When the degree of swelling is within this range, the stickiness of the binder is increased and bonding among the glass fibers becomes stronger, leading to further improvement in the strength of the glass fiber nonwoven.

The cold water solubility of the polyvinyl alcohol may be 10.0% or less. When the cold water solubility is within the range, the amount of the binder remaining in the glass fiber nonwoven is increased and bonding among the glass fibers becomes stronger.

The shape of the polyvinyl alcohol is preferably a particle shape. With regards to the particle diameter distribution of the polyvinyl alcohol, it is preferable that the ratio of particles with a particle diameter of 53 µm or less is 50% or less and the ratio of particles with a particle diameter of 180 µm or more is 5% or less. When the particle diameter distribution of the polyvinyl alcohol satisfies the above ranges, the surfaces of the glass fiber nonwoven are smooth.

According to the present invention, a binder for glass fiber nonwoven and containing a polyvinyl alcohol can be provided, the binder being capable of forming glass fiber nonwoven that has adequate strength even when the glass fiber nonwoven is thin.

DETAILED DESCRIPTION OF THE EMBODIMENT(S)

A preferable present embodiment is described below in detail.

A binder for glass fiber nonwoven (nonwoven (nonwoven) made from glass fiber) according to the present embodiment contains a polyvinyl alcohol that has a shape with an aspect ratio of 1.9 to 30 and a degree of saponification of 99.0 mol % or more (hereinafter, the polyvinyl alcohol can be called "a PVA component"). As long as the PVA component is contained, additional components can also be contained and the general shape of the binder for glass fiber nonwoven can be, for example, in a liquid form, a film form, or a powder form.

The content of the PVA component based on the total mass of the binder for glass fiber nonwoven is preferably 10.0% by mass or more, further preferably 50.0% by mass or more, and particularly preferably 0.0% by mass or more. The content of the PVA component based on the total mass of the binder for glass fiber nonwoven is preferably 10.0 to 100.0% by mass, further preferably 50.0 to 100.0% by mass, and particularly preferably 80.0 to 100.0% by mass. As the additional components, a vinyl acetate binder fiber and/or a styrene-acrylic copolymer can be contained. The content of the vinyl acetate binder fiber is preferably 50.0 to 80.0% by mass and the content of the styrene-acrylic copolymer is preferably 10.0 to 80.0% by mass, based on the total mass of the binder for glass fiber nonwoven.

When the binder for glass fiber nonwoven is in a liquid form, the viscosity thereof at 25° C. is preferably 10.0 to 66 mPa·s, further preferably 24.0 to 66 mP·s, and particularly preferably 24.0 to 32 mPa·s.

The polyvinyl alcohol in the present specification may be, for example, a polymer obtained by completely or partially saponifying a polyvinyl ester that results from polymerization of a vinyl ester such as vinyl acetate. The "polymer" is in conformance with the definition of "Polymers" provided by the Commission on Macromolecular Nomenclature, International Union of Pure and Applied Chemistry (IUPAC).

The polyvinyl ester may be a homopolymer of vinyl esters, or may be a copolymer of a vinyl ester with a monomer that is copolymerizable with the vinyl ester and is not a vinyl ester. From the viewpoint of stability of the resulting polyvinyl alcohol, a homopolymer of vinyl esters is preferable.

The vinyl ester or vinyl esters are preferably vinyl acetate, vinyl propionate, vinyl propionate, vinyl valerate, vinyl caprate, vinyl laurate, vinyl stearate, vinyl benzoate, or vinyl pivalate, for example. From the viewpoint of readiness for polymerization, vinyl acetate is preferable.

Examples of the monomer that is copolymerizable with the vinyl ester and is not a vinyl ester include α-olefin monomers such as ethylene and propylene, alkyl (meth)acrylate ester monomers such as methyl (meth)acrylate, ethyl (meth)acrylate, butyl (meth)acrylate, and 2-ethylhexyl (meth)acrylate, unsaturated amide monomers such as (meth)acrylamide and N-methylol acrylamide, unsaturated carboxylic acid monomers such as (meth)acrylic acid, crotonic acid, maleic acid, itaconic acid, and fumaric acid, unsaturated carboxylic acid alkyl (methyl, ethyl, and propyl, for example) ester monomers, unsaturated carboxylic acid anhydrides such as maleic anhydride, salts of unsaturated carboxylic acids with sodium, potassium, ammonium, and the like, glycidyl group-containing monomers such as allyl glycidyl ether and glycidyl (meth)acrylate, sulfonic group-containing monomers or salts thereof such as 2-acrylamide-2-methylpropanesulfonic acid, phosphate group-containing monomers such as acid phosphoxy ethyl methacrylate and acid phosphoxy propyl methacrylate, and alkyl vinyl ether monomers.

The aspect ratio of the PVA component is 1.9 to 30, preferably 1.9 to 25, and more preferably 1.9 to 20. The "aspect ratio" in the present specification refers to a value measured by a particle size/shape distribution analyzer (manufactured by Seishin Enterprise Co., Ltd., trade name: "PITA-1"), and a value obtained by dividing the maximum length of a particle under measurement by the maximum vertical length of the particle under measurement. The aspect ratio can be obtained as a mean aspect ratio based on number distribution, by determining, with use of methanol as a dispersion medium, the shapes of particles under measurement and the numbers of the shapes and using an aspect ratio corresponding to the mean frequency of the determined numbers. The number of particles under measurement herein is about 3000.

The degree of saponification of the PVA component is 99.0 mol % or more and, from the viewpoints of further inhibition of dissolution of the polyvinyl alcohol in water and further improvement in the strength of the resulting glass fiber nonwoven, is preferably 99.1 mol % or more, more preferably 99.2 mol % or more, and further preferably 99.3 mol % or more. The "degree of saponification" in the present specification refers to a value determined by calculation from measurement in conformance with JIS K 6726 "3.5 Degree of saponification".

The degree of saponification can also be determined quickly and accurately on a near-infrared analyzer. For example, by measuring near-infrared absorption spectra of a plurality of standard samples of polyvinyl alcohol with known degree of saponifications by the titration method, and then subjecting the measurement results to multiple linear regression analysis, principal component regression analysis, the partial least square method, or the like to plot a calibration curve, the degree of saponification of polyvinyl alcohol under measurement can be measured. By a measurement method using a near-infrared analyzer, the degree of saponification of polyvinyl alcohol under production can also be measured during the production.

The binder for glass fiber nonwoven according to the present embodiment contains the PVA component. Accordingly, by using the binder, glass fiber nonwoven having adequate strength can be produced even when the glass fiber nonwoven is thin.

The number average molecular weight of the PVA component may be 160 to 200000, 1200 to 12000, or 18000 to 80000. The "number average molecular weight" in the present specification refers to a value obtained from a calibration curve plotted based on measurement by the gel permeation chromatography method and using standard polystyrene.

The viscosity-average degree of polymerization of the PVA component may be 100 to 10000, 700 to 6000, or 1000 to 4000. The "viscosity-average degree of polymerization" in the present specification is determined by the following formula (1) in which limiting viscosity [η] (g/dL) is measured at 30° C. with an Ostwald viscometer using ion-exchanged water as solvent.

$$\log(P) = 1.613 \times \log([\eta] \times 10^4/8.29) \quad (1)$$

In the formula, P is the viscosity-average degree of polymerization.

The degree of swelling of the PVA component is preferably 2.0 to 5.0, more preferably 2.5 to 5.0, further preferably 2.7 to 5.0, and particularly preferably 2.7 to 3.4. The "degree of swelling" in the present specification is obtained by adding 10.0 g (dry mass) of the polyvinyl alcohol to 240.0 g of water at 20.0° C., stirring the mixture with a stirrer for 15 minutes, terminating the stirring, leaving the mixture still standing for 60 minutes, filtrating the mixture through No. 5A filter paper in a Buchner funnel, and then calculating the ratio of the mass of the polyvinyl alcohol to the dry mass of the polyvinyl alcohol.

The cold water solubility of the PVA component is preferably 10.0% or less, more preferably 9% or less, and particularly preferably 8% or less. The "cold water solubility" in the present specification refers to solubility in water at 20.0° C. More specifically, 10.0 g (mass) of the polyvinyl alcohol is added to 240.0 g of water at 20.0° C., the mixture is stirred for 15 minutes and then left still standing for 60 minutes, a portion of the supernatant is recovered with a 10-mL pipette and then dried at 150° C. for 45 minutes, the solid matter of the portion of the supernatant is measured to determine the concentration of the aqueous solution by calculation, and then the ratio of the mass of polyvinyl alcohol dissolved in water to the initial mass of polyvinyl alcohol is used as the cold water solubility.

The average particle diameter of the PVA component is preferably 250 μm or less, more preferably 100 μm or less, and particularly preferably 80 μm or less, from the viewpoint of further improvement in the smoothness and evenness of the resulting glass fiber nonwoven. The average particle diameter of the polyvinyl alcohol is preferably 10 μm or more and further preferably 50 μm or more, from the viewpoint of further improvement in the strength of the resulting glass fiber nonwoven. The average particle diameter of the polyvinyl alcohol herein refers to the value of 50% cumulative undersize percentage determined based on measurement in conformance with JIS Z 8815.

The PVA component preferably has a particle shape or a powder shape, and the average particle diameter thereof may be uniform or may have a distribution. The PVA component preferably has a particle shape, and in the particle diameter distribution of the polyvinyl alcohol, a ratio of particles with a particle diameter of 53 μm or less is preferably 50% or less, more preferably 40% or less, and further preferably 35% or less and a ratio of particles with a particle diameter of 180 μm or more is preferably 5% or less, more preferably 3% or less, and further preferably 1% or less.

The method of producing the PVA component includes at least a step of saponifying the polyvinyl ester. In the method of producing the polyvinyl alcohol according to the present embodiment, the belt saponification method, the kneader method, or the like may be employed, for example, and the kneader method is preferably employed. The kneader method herein is a method of simultaneously performing thorough kneading and milling of the polyvinyl ester and a catalyst together in a kneader-type kneading apparatus to give the polyvinyl alcohol.

Saponification of the polyvinyl ester may be performed, for example, in the presence of a saponification catalyst or in an organic solvent. The saponification catalyst may be, for example, an alkaline catalyst such as sodium hydroxide, potassium hydroxide, sodium alcoholate, and sodium carbonate or an acid catalyst such as sulfuric acid, phosphoric acid, and hydrochloric acid. From the viewpoint of further improvement in the rate of the saponification reaction, the saponification catalyst is preferably an alkaline catalyst and is more preferably sodium hydroxide.

The amount of the saponification catalyst may be, for example, 0.001 to 0.1 mol, 0.005 to 0.05 mol, or 0.01 to 0.05 mol, based on 1 mol of the polyvinyl ester.

The organic solvent may be an alcohol. The alcohol may be a monoalcohol such as methanol, ethanol, propanol, ethylene glycol, and propylene glycol or may be a polyhydric alcohol such as diethylene glycol and glycerol. The alcohol is preferably methanol.

The temperature for saponification can be 20 to 60° C., for example.

The method of saponifying the polyvinyl ester is not particularly limited, and may be, for example, a method to add the saponification catalyst to a solution in which the polyvinyl ester is dissolved and mixing the resultant or a method to add the saponification catalyst to a solution in which the polyvinyl ester is dispersed and mixing the resultant, either in a non-aqueous system or in an aqueous system.

The production method described above may include a step of drying the resulting polyvinyl alcohol, a step of milling the polyvinyl alcohol in a mill or the like, a step of performing sizing based on particle diameters, a step of subjecting the polyvinyl alcohol in a powder form to heat treatment, or the like.

The temperature for drying the polyvinyl alcohol is not particularly limited and may be within the range from 20 to 150° C.

The mill used for milling the polyvinyl alcohol can be a knife-type mill, a hammer-type mill, a cutter-type mill, or the like and is preferably a hammer-type mill.

The binder for glass fiber nonwoven according to the present embodiment is particularly useful as a so-called primary binder. The "primary binder" in the present specification, which is also called an internal binder, is a constituent of a slurry solution that coexists with a glass fiber during glass fiber nonwoven production.

Next, the glass fiber nonwoven obtained by using the binder for glass fiber nonwoven according to the present embodiment is described. The glass fiber nonwoven contains the glass fiber and the binder for glass fiber nonwoven, with the glass fiber being bonded to the binder for glass fiber nonwoven.

The glass fiber may be in a form of a fiber sheet in which a plurality of fibers cross each other. Specifically, in the fiber sheet, the plurality of glass fibers are oriented in two or more directions or oriented randomly to cross each other and, at points of crossing, the glass fibers may be held together through one or more configurations or structures such as entanglement among the glass fibers and adhesion caused by the binder for glass fiber nonwoven. The fiber sheet may be a woven fabric, a nonwoven fabric, or the like and, from the viewpoint of improvement in productivity, is preferably a nonwoven fabric.

The glass fiber may be a monofilament or may be a plurality of monofilaments twisted together. When twisted filaments are used, the number of twists in the glass fiber may be 5 T/25 mm or less, 3 T/25 mm or less, or 2 T/25 mm or less. The shape of the cross section of the fiber is not particularly limited and is preferably substantially circular.

The length of the glass fiber may be 3.0 to 25.0 mm or 6.0 to 10.0 mm, for example. The diameter of the glass fiber may be 6.5 to 13.5 μm or 8.0 to 12.0 μm, for example.

As the glass fiber, ACS6S-750 manufactured by Nippon Electric Glass Co., Ltd., FS-19W-N manufactured by Nippon Muki Co., Ltd., or the like is preferably used, for example.

The glass fiber nonwoven may further contain, in addition to the glass fiber, a fibrous filler such as an inorganic fiber and an organic fiber, a ceramic fiber, a carbon fiber, or the like, for example.

The thickness of the glass fiber nonwoven is preferably 500 μm or less, more preferably 400 μm or less, and particularly preferably 350 μm or less. The thickness of the glass fiber nonwoven is preferably 100 μm or more, more preferably 120 μm or more, and further preferably 130 μm or more. The thickness of the glass fiber nonwoven refers to a value measured by the method A of JIS L 1913.

The basis weight of the glass fiber nonwoven is preferably 30 to 100 g/m$^2$ and further preferably 50 to 100 g/m$^2$. The basis weight of the glass fiber nonwoven in the present specification refers to a value measured by a test method of JIS P8113.

The tensile strength of the glass fiber nonwoven is preferably 0.60 N/20 mm or more, and particularly preferably 0.65 N/20 mm or more. The tensile strength of the glass fiber nonwoven in the present specification is the average value of six measurements conducted by subjecting a sample of glass fiber nonwoven chopped into a size of 25 mm in width and 100 mm in length to measurement on a Tension testing instrument (A&D Company, Limited, trade name: "HTM-100") under conditions of full-scale: 100 g, a zipper width: 50 mm, and a strain rate: 50 mm/min.

The air permeability of the glass fiber nonwoven may be 50 Pa·s/m or more, or 55 Pa·s/m or more. The air permeability in the present specification refers to a value of permeating resistance measured on an air-permeability tester KES-F8 manufactured by Kato tech Co., Ltd. When the permeating resistance is low, the air permeability is excellent.

The glass fiber nonwoven can be produced, for example, by a method that includes:
(1) a step of preparing a slurry containing the binder for glass fiber nonwoven according to the present embodiment as the primary binder,
(2) a sheet-forming step of preparing a solution containing the slurry and the glass fiber and then straining the solution to remove solvent so as to form a sheet, and
(3) a step of dipping the resulting sheet in a solution containing a secondary binder and then removing solvent to produce glass fiber nonwoven.

As the secondary binder, the binder for glass fiber nonwoven described above may be used, or another binder may be used. Examples of the another binder include binders such as polyvinyl alcohols other than the polyvinyl alcohol described above, styrene-butadiene resins, acrylic resins, styrene-acrylic resins, vinyl acetate-acrylic resins, and vinyl acetate-ethylene comonomers.

The glass fiber nonwoven according to the present embodiment has adequate strength even in a form of a thin film and is therefore suitable as a building component such as a wallpaper sheet or a ceiling material. By using the glass fiber nonwoven according to the present embodiment, weight reduction can be pursued.

This present embodiment can also provide a method that includes use of the binder for glass fiber nonwoven and containing a polyvinyl alcohol having a shape with an aspect ratio of 1.9 to 30 and a degree of saponification of 99.0 mol % or more and improves the strength of glass fiber nonwoven. This method of improving the strength of glass fiber nonwoven specifically includes, for example, a step of incorporating the polyvinyl alcohol as the primary binder in the slurry.

EXAMPLES

The present invention will be specifically described by examples. The scope of the present invention, however, is not limited to these examples.

Example 1

Into a polymerization vessel equipped with a reflux condenser, a tap funnel, and a stirrer, 100 parts by mass of vinyl acetate, 17.0 parts by mass of methanol, and 0.02 mol % of azobisisobutyronitrile were charged, followed by polymerization in a nitrogen stream while stirring at below the boiling point for 3.0 hours. Then, an unreacted vinyl acetate monomer was removed from the polymerization system to give a solution of a polyvinyl acetate resin having a degree of polymerization of 2175 in methanol (solid content: 30.5% by mass).

To 15 kg of the resulting solution, in a 30-1 kneader-type stirring tank, 21 g of NaOH (0.025 mol based on the amount of vinyl acetate) at 30° C. was added, followed by a reaction for 60 minutes to carry out saponification. As a result, a slurry of polyvinyl alcohol having a degree of saponification of 99.3 mol % was obtained. To the resulting slurry, 20.5 g of acetic acid in terms of pure $CH_3COOH$ was added, followed by thorough stirring and then filtration with a centrifugal filter to give a wet cake containing 41% of volatile matter. The resulting wet cake was dried to give 2.4 kg of polyvinyl alcohol containing 3.6% of volatile matter. The resulting polyvinyl alcohol was milled in an air-flow mill and then sieved through a 180-μm-mesh sieve to give 2.2 kg of polyvinyl alcohol having a degree of saponification of 99.3 mol % as undersize matter.

Example 2

In the same manner as in Example 1 except that a 160-μm-mesh sieve was used, 2.1 kg of polyvinyl alcohol having a degree of saponification of 99.3 mol % was obtained.

Example 3

In the same manner as in Example 1 except that a 140-μm-mesh sieve was used, 1.4 kg of polyvinyl alcohol having a degree of saponification of 993 mol % was obtained.

Example 4

In the same manner as in Example 1 except that a 250-μm-mesh sieve was used, 2.3 kg of polyvinyl alcohol having a degree of saponification of 99.3 mol % was obtained.

Comparative Example 1

A polyvinyl acetate resin was obtained in the same manner as in Example 1. Using 1150 g of the resulting polyvinyl acetate resin, a polyvinyl acetate resin solution in methanol (solid content: 30% by mass) was obtained. The resulting solution in an amount of 15 kg was warmed to 40° C. To the solution, while stirring in a 30-l kneader-type stirring tank, a methanol solution having a sodium hydroxide concentration of 5% by mass (0.025 mol as sodium hydroxide based on the amount of vinyl acetate) was added, followed by a reaction for 60 minutes to carry out saponification. The resulting gel was milled, and then liquid was separated and removed in a centrifuge, followed by drying the solid matter to give polyvinyl alcohol containing 3.8% of volatile matter. The resulting polyvinyl alcohol was milled in an air-flow mill and then sieved through a 180-μm-mesh sieve to give 150 g of polyvinyl alcohol having a degree of saponification of 99.3 mol % as undersize matter.

Comparative Example 2

Into a polymerization vessel equipped with a reflux condenser, a tap funnel, and a stirrer, 100 parts by mass of vinyl acetate, 14.0 parts by mass of methanol, and 0.02 mol % of azobisisobutyronitrile were charged, followed by polymerization in a nitrogen stream while stirring at below the boiling point for 3.0 hours. Then, an unreacted vinyl acetate monomer was removed from the polymerization system to give a solution of a polyvinyl acetate resin having a degree of polymerization of 3170 in methanol (solid content: 20.5% by mass).

To 15 kg of the resulting solution, in a 30-1 kneader-type stirring tank, 21 g of NaOH at 30° C. was added, followed by saponification to give a slurry of polyvinyl alcohol having a degree of saponification of 98.0 mol %. To the resulting slurry, 20.5 g of acetic acid in terms of pure $CH_3COOH$ was added, followed by thorough stirring and then filtration with a centrifugal filter to give a wet cake containing 41% of volatile matter. The resulting wet cake was dried to give 2.0 kg of polyvinyl alcohol containing 3.6% of volatile matter. The resulting polyvinyl alcohol was milled in an air-flow mill and then sieved through a 180-μm-mesh sieve to give 1.9 kg of polyvinyl alcohol having a degree of saponification of 98.0 mol % as undersize matter.

Comparative Example 3

A polyvinyl acetate resin was obtained in the same manner as in Example 1. Using 1150 g of the resulting polyvinyl acetate resin, a polyvinyl acetate resin solution in methanol (solid content: 20% by mass) was obtained. The resulting solution in an amount of 15 kg was warmed to 40° C. To the solution, while stirring in a 30-l kneader-type stirring tank, a methanol solution having a sodium hydroxide concentration of 5% by mass (0.025 mol as sodium hydroxide based on the amount of vinyl acetate) was added, followed by a saponification reaction for 60 minutes. As a result, a slurry of polyvinyl alcohol having a degree of saponification of 99.5 mol % was obtained. To the resulting slurry, 20.5 g of acetic acid in terms of pure $CH_3COOH$ was added, followed by thorough stirring and then filtration with a centrifugal filter to give a wet cake containing 38% of volatile matter. The resulting wet cake was milled and dried to give 2.0 kg of polyvinyl alcohol containing 3.2% of volatile matter and having a degree of saponification of 99.5 mol %.

Comparative Example 4

The same procedure as in Comparative Example 1 was performed except that, after milling the polyvinyl alcohol in an air-flow mill, heat treatment at 120° C. was conducted for 2 hours and sieving through a 160-μm-mesh sieve was conducted. As a result, 1.8 kg of polyvinyl alcohol having a degree of saponification of 99.3 mol % was obtained.

As for each of the polyvinyl alcohols obtained in Examples 1 to 4 and Comparative Examples 1 to 4, the aspect ratio, the degree of swelling, the cold water solubility, and the average particle diameter were measured by the following methods. The results are shown in Table 1 and Table 2.

<Measurement of Aspect Ratio and Average Particle Diameter>

The aspect ratio was measured by particle size and shape distribution analyzer (manufactured by Seishin Enterprise, trade name: "PITA-1"). Under the following conditions, a still image of a sample flowing in a dispersion medium was taken (in the still image, 3000 particles were arbitrarily selected for measurement), followed by image analysis to determine the aspect ratio (aspect ratio=(maximum length)/(maximum vertical length)) and the average particle diameter.

(Measurement Conditions)
Sample: 0.1 g
Dispersion medium: methanol
Flow rate of sample liquid 1: 10 μL/sec
Flow rate of sample liquid 2: 10 μL/sec
Flow rate of sample liquid: 0.08 μL/sec
Binarization level: 200

<Measurement of Degree of Swelling>

As for each of the polyvinyl alcohols obtained in Examples 1 to 4 and Comparative Examples 1 to 4, the degree of swelling was measured. First, a sample of 10.0 g of the polyvinyl alcohol after drying was added to 240.0 g of water at 20.0° C. The resulting mixture was stirred with a stirrer for 15 minutes and, after the stirring was terminated, was left still standing for 60 minutes. Subsequently, the mixture was filtrated through No. 5A filter paper in a Buchner funnel, followed by calculating the ratio of the mass of the polyvinyl alcohol to the dry mass of the polyvinyl alcohol.

<Measurement of Cold Water Solubility>

As for each of the polyvinyl alcohols obtained in Examples 1 to 4 and Comparative Examples 1 to 4, the cold water solubility was measured. First, a sample of 10.0 g of the polyvinyl alcohol after drying was added to water at 20.0° C. After stirred for 15 minutes and then left still standing for 60 minutes, a portion of the supernatant was recovered with a 10-ml pipette and then dried at 150° C. for 45 minutes, the solid matter of the portion of the supernatant was measured to determine the concentration of the aqueous solution by calculation. The ratio of the mass of polyvinyl alcohol dissolved in water to the initial mass of polyvinyl alcohol was used as the cold water solubility.

TABLE 1

|  | Unit | Example 1 | Example 2 | Example 3 | Example 4 |
|---|---|---|---|---|---|
| Degree of saponification | mol % | 99.3 | 99.3 | 99.3 | 99.3 |
| Aspect ratio | — | 2.09 | 2.10 | 1.96 | 2.11 |
| Ratio of particles with particle diameter of 180 μm or more | % | 0.8 | 0.1 | 0.6 | 8.0 |
| Ratio of particles with particle diameter of 53 μm or less | % | 25.0 | 27.4 | 45.8 | 19.8 |
| Degree of swelling | Times | 2.9 | 2.9 | 3.8 | 3.0 |
| Cold water solubility | % | 5.8 | 3.9 | 10.0 | 7.1 |

TABLE 2

|  | Unit | Comp. Example 1 | Comp. Example 2 | Comp. Example 3 | Comp. Example 4 |
|---|---|---|---|---|---|
| Degree of saponification | mol % | 99.3 | 98.0 | 99.5 | 98.3 |
| Aspect ratio | — | 1.86 | 1.81 | 1.49 | 1.87 |
| Ratio of particles with particle diameter of 180 μm or more | % | 0.0 | 0.0 | 0.6 | 0.0 |
| Ratio of particles with particle diameter of 53 μm or less | % | 15.4 | 10.2 | 22.0 | 16.1 |
| Degree of swelling | Times | 1.7 | 6.1 | 1.8 | 3.1 |
| Cold water solubility | % | 5.1 | 21.4 | 8.2 | 18.0 |

Next, using each of the polyvinyl alcohols obtained in Examples 1 to 4 and Comparative Examples 1 to 4, glass fiber nonwoven was prepared and evaluated. The results are shown in Table 3 and Table 4.

First, 0.3 part by mass of the polyvinyl alcohol obtained above and 2.8 parts by mass of a glass fiber (fiber diameter; 9 μm, fiber length; 3 mm) were added to 2000 parts by mass of water, followed by mixing in a standard pulp disintegrator (manufactured by Kumagai Riki Kogyo Co., Ltd.) for 20 minutes to give a slurry mix. A portion of the slurry in an amount of 50 g/m$^2$ in dry weight was subjected to processing by a papermaking method called Tamesuki using an 80-mesh wire, followed by removal of water. Then, the wet paper was transferred from the wire onto a piece of filter paper. Subsequently, pressing was performed with a square type automatic sheet press (Kumagai Riki Kogyo Co., Ltd.) at 0.4 MPa for 5 minutes. Then, the wet paper was peeled from the filter paper and dried in a rotary dryer (manufactured by Kumagai Riki Kogyo Co., Ltd.) to 110° C.

<Basis Weight>

The basis weight was measured according to a test method of JIS P8113.

<Tensile Strength>

The tensile strength was evaluated based on the average value of six measurements conducted by subjecting a sample of the glass fiber nonwoven chopped into a size of 25 mm in width and 100 mm in length to measurement on a Tensilon testing instrument (A&D Company, Limited, trade name: "HTM-100") under conditions of full-scale: 100 g, a zipper width: 50 mm, and a strain rate: 50 mm/min.

<Air Permeability>

The air permeability refers to a value of permeating resistance measured on an air-permeability tester KES-F8 manufactured by Kato tech Co., Ltd. When the value of permeating resistance is low, the air permeability is high.

<Thickness>

The thickness of the glass fiber nonwoven was measured by the method A of JIS L 1913.

<Degree of Smoothness>

The degree of smoothness was evaluated by a panel of arbitrarily selected skilled people. The glass fiber nonwoven was chopped into a size of 25 mm in width and 100 mm in length for use as a sample, and the degree of smoothness was evaluated based on the following criteria.

◯: the surface was very smooth, with no sensation of roughness or the like.

x: the surface had a binder component remaining in a particle shape, with a sensation of roughness.

TABLE 3

|  | Unit | Example 1 | Example 2 | Example 3 | Example 4 |
|---|---|---|---|---|---|
| Basis weight | g/m$^2$ | 51.8 | 50.0 | 49.8 | 51.9 |
| Tensile strength | N/20 mm | 0.75 | 0.81 | 0.69 | 0.78 |
| Air permeability | Pa · s/m | 62 | 57 | 63 | 58 |
| Thickness | μm | 330 | 320 | 336 | 330 |
| Degree of smoothness | — | ○ | ○ | ○ | x |

TABLE 4

|  | Unit | Comp. Example 1 | Comp. Example 2 | Comp. Example 3 | Comp. Example 4 |
|---|---|---|---|---|---|
| Basis weight | g/m$^2$ | 46.1 | 47.6 | 45.9 | 53.1 |
| Tensile strength | N/20 mm | 0.57 | 0.64 | 0.58 | 0.46 |
| Air permeability | Pa · s/m | 68 | 67 | 60 | 67 |
| Thickness | μm | 300 | 310 | 305 | 300 |
| Degree of smoothness | — | x | ○ | x | ○ |

What is claimed is:

1. Polyvinyl alcohol particle or particles having a particle shape with an aspect ratio of 1.9 to 2.11 and having a degree of saponification of 99.0 mol % or more, wherein a ratio of particles with a particle diameter of 53 μm or less is 50% or less and a ratio of particles with a particle diameter of 180 μm or more is 8% or less, in a particle diameter distribution of the polyvinyl alcohol particles.

2. The polyvinyl alcohol particles according to claim 1, wherein the polyvinyl alcohol particles have a degree of swelling of 2.5 to 5.0.

3. The polyvinyl alcohol particles according to claim 1, wherein the polyvinyl alcohol particles have a cold water solubility of 10.0% or less.

4. The polyvinyl alcohol particles according to claim 1, wherein the polyvinyl alcohol particles have a degree of swelling of 2.5 to 5.0 and a cold water solubility of 3.9% to 10.0%.

* * * * *